(12) United States Patent
Takeshita

(10) Patent No.: US 7,399,029 B2
(45) Date of Patent: Jul. 15, 2008

(54) SYSTEM FOR DISCHARGING EXHAUST AIR FROM A RADIATOR IN A STRADDLE TYPE VEHICLE

(75) Inventor: Hirotoshi Takeshita, Shizuoka-ken (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 238 days.

(21) Appl. No.: 11/346,996

(22) Filed: Feb. 3, 2006

(65) Prior Publication Data

US 2007/0024089 A1 Feb. 1, 2007

(30) Foreign Application Priority Data

Feb. 4, 2005 (JP) ............................. 2005-029816

(51) Int. Cl.
*B60R 27/00* (2006.01)
(52) U.S. Cl. ................ 296/203.01; 180/68.1; 180/68.3; 180/309
(58) Field of Classification Search .............. 123/41.49, 123/41.57; 180/68.1, 68.2, 68.3, 309, 38.6; 296/190.09, 192, 203.01, 193.09
See application file for complete search history.

(56) References Cited

U.S. PATENT DOCUMENTS 4,830,135 A * 5/1989 Yamashita .................. 180/68.1
2005/0224266 A1* 10/2005 Konno et al. ............... 180/68.1

* cited by examiner

*Primary Examiner*—Lori L Lyjak
(74) *Attorney, Agent, or Firm*—Knobbe, Martens, Olson & Bear, LLP

(57) ABSTRACT

A system for discharging exhaust air from a radiator in a straddle type vehicle (e.g., a motorcycle) is provided that can discharge heated air from the radiator to the outside of the vehicle in an efficient manner. The system comprises a radiator that can be positioned farther forward than an engine in the straddle type vehicle. A front cowl at least partially covers the front portion of the vehicle, including the radiator and engine. The front cowl comprises at least one vent passage for receiving outside air and directing such air rearward and at least one discharge port for discharging exhaust air from the radiator. Because of a pressure difference occurring due to high-speed air current flowing along the at least one vent passage, the heated exhaust air can be positively discharged from the radiator through the at least one discharge port.

25 Claims, 12 Drawing Sheets

SYSTEM FOR DISCHARGING EXHAUST AIR FROM A RADIATOR IN A STRADDLE TYPE VEHICLE

CROSS-REFERENCE TO RELATED APPLICATIONS

This application is based on and claims priority under 35 U.S.C. § 119(a)-(d) to Japanese Patent Application No. 2005-029816, filed Feb. 4, 2005, the entire contents of which is hereby incorporated by reference.

BACKGROUND OF THE INVENTION

1. Field of the Invention

The present invention relates to straddle type vehicles (e.g., motorcycles) and, in particular, to a straddle type vehicle having a system for discharging exhaust air from a radiator adapted to efficiently discharge such exhaust air to the outside of the vehicle.

2. Description of the Related Art

Motorcycles typically have an engine disposed in a longitudinally central portion of a vehicle body, a radiator positioned in front of the engine, and a front cowl disposed on a front portion of the vehicle so as to cover a front surface of the vehicle body. The front cowl often includes air discharge ports in its side walls, which are adapted to discharge the exhaust air that has passed through the radiator. Such constructions are taught, for instance, by Japanese Utility Model Publication JP-UM-B-5-9995, Japanese Utility Model JP-UM-B-4-50228 and Japanese Patent Publication No. JP-A-62-283082.

Coolant circulates through the radiator and is used to cool various engine components. The radiator receives cool air that flows through the radiator in order to conduct heat away from the radiator and thereby reduce the temperature of the circulating coolant. Outside air (i.e., cool air) is typically delivered to the radiator while the motorcycle is operating via openings positioned in the center portion of a front wall of the front cowl. After such air passes through the radiator, heated exhaust air is sent out of the radiator through air discharge ports. In typical front cowl assemblies, forward movement of the motorcycle forces outside air to travel rearward along the side surfaces of the front cowl. The exhaust air exiting the air discharge ports is drawn out of the radiator by the outside air flowing along the side surfaces of the front cowl. As a result, the discharge of exhaust air from the radiator is dependent on the air flow along the side surfaces of the front cowl and, therefore, is limited.

SUMMARY OF THE INVENTION

To address the aforementioned limitation, an object of the present invention is to provide a straddle type vehicle (e.g., a motorcycle) that can efficiently discharge the exhaust air that has passed through the radiator to the outside of the vehicle by providing vent passages that force outside air to flow rearward along the side surfaces of the front cowl.

One aspect of the present invention involves a straddle type vehicle comprising a frame. The frame is supported by a wheel. The wheel rotates about a generally horizontal axis. An engine is supported by the frame. A radiator is positioned generally forward of the engine. A front cowl encloses at least a portion of the frame. The front cowl extends from a location generally over the front wheel to a location proximate the engine. The front cowl generally defines a chamber in which the radiator is positioned. An air discharge port is defined in a side surface of the front cowl at a location generally rearward of the radiator. The discharge port is capable of receiving air that has passed through the radiator. A vent passage is defined along a longitudinal portion of the side surface of the front cowl. At least a portion of the longitudinal portion is positioned vertically above the air discharge port. The vent passage has a forward facing opening such that air through which the vehicle operates can be directed into the vent passage and at least a portion of the vent passage comprises a generally c-shaped cross-section.

An aspect of the present invention also involves a straddle type vehicle comprising at least one wheel that rotates about a generally horizontal axis and a vehicle body supported at least in part by the at least one wheel. The vehicle body supports an engine and a radiator such that the radiator, in one embodiment, is positioned farther forward than the engine. A front cowl having at least one side wall covers the front portion of the vehicle body and includes at least one vent passage and at least one discharge port. The at least one vent passage receives outside air and directs such air rearward along the at least one side wall of the front cowl, while the at least one discharge port discharges heated exhaust air from the radiator to the outside of the vehicle.

An additional aspect of the present invention involves a straddle type vehicle having at least one wheel and a vehicle body supported by the at least one wheel. The vehicle body includes a front portion having a front end. The vehicle body supports an engine and a radiator such that the radiator, in one embodiment, is positioned farther forward than the engine. A front cowl is provided which comprises an upper cowl, a middle cowl, and a lower cowl. At least one vent passage and at least one discharge port are disposed on the front cowl. The at least one vent passage includes at least one extension that extends the at least one vent passage in a generally longitudinal direction to a position above and substantially near the at least one discharge port.

In accordance with an additional aspect of the present invention, a straddle type vehicle comprises at least one wheel that rotates about a generally horizontal axis, a vehicle body supported at least in part by the at least one wheel, and a radiator supported at least in part by the vehicle body. The vehicle also includes a front cowl that at least partially covers a front portion of the vehicle body. In this embodiment, the front cowl comprises at least one vent passage for receiving air from outside of the vehicle and directing such air rearward and at least one discharge port for discharging exhaust air from the radiator to the outside of the vehicle.

BRIEF DESCRIPTION OF THE DRAWINGS

These and other features, aspects, and advantages of the present invention will now be described in connection with a preferred embodiment of the invention shown in the accompanying drawings. The illustrated embodiment, however, is merely an example and is not intended to limit the invention. The drawings include thirteen figures.

DETAILED DESCRIPTION OF THE PREFERRED EMBODIMENT

Figure 1:
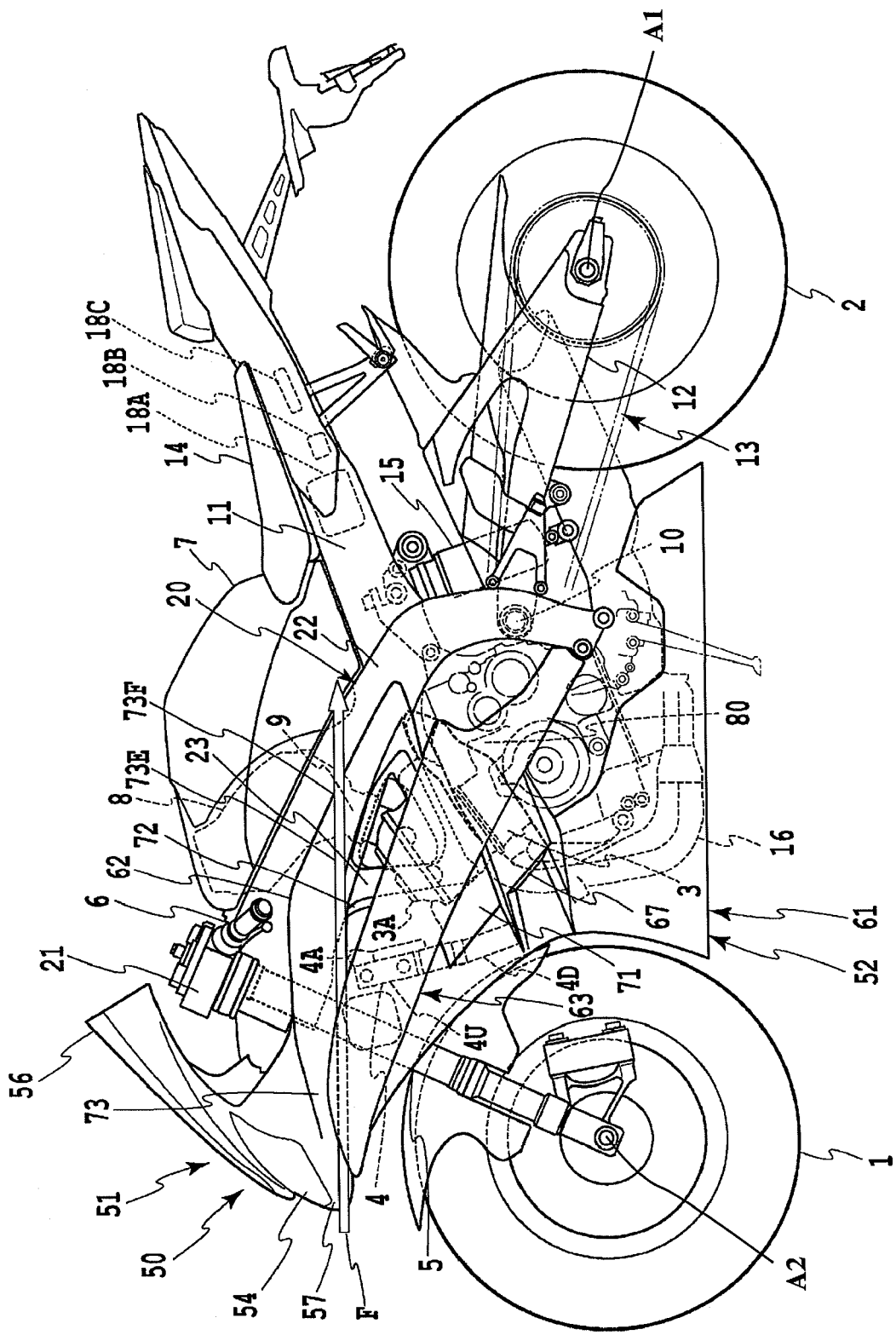
FIG. 1 is a left side elevational view of a straddle type vehicle including a system for discharging exhaust air from a radiator of the vehicle, which system is arranged and configured in accordance with a preferred embodiment of the present invention. The straddle type vehicle is shown in a condition where no riders are seated on the vehicle, the front and rear wheels are both on the ground, and the vehicle is not leaning to a side or supported by a main stand.

A system for discharging exhaust air from a radiator is illustrated in the drawings and is described below in the context of a straddle type vehicle. However, the system can be used with other types of vehicles. Preferably, the system can be used with vehicles which have a wheel that rotates about a generally horizontal axis, a steering column, a steering mechanism coupled to the top of the steering column, and a straddle type seat located substantially near the steering column. For example, such vehicles in which the system described herein can be employed include, but are not limited to, a motorcycle, a motorized scooter, and a multi-terrain vehicle. Accordingly, the following description and the drawings describe a motorcycle; however, the present system for discharging exhaust air from a radiator can be used on other types of straddle type vehicles as well.

Figure 2:
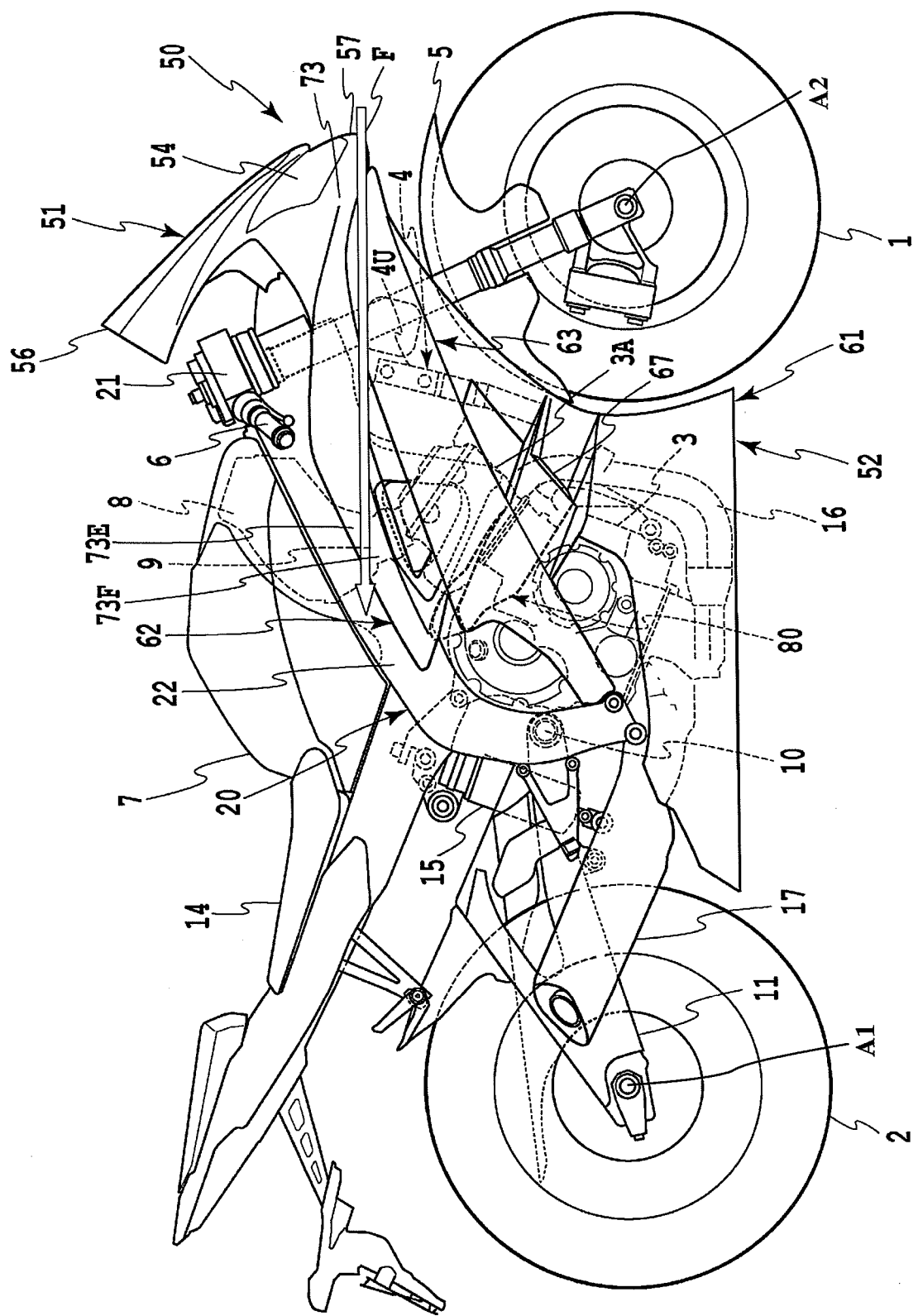
FIG. 2 is a right side elevational view of the straddle type vehicle of FIG. 1.
Figure 3:
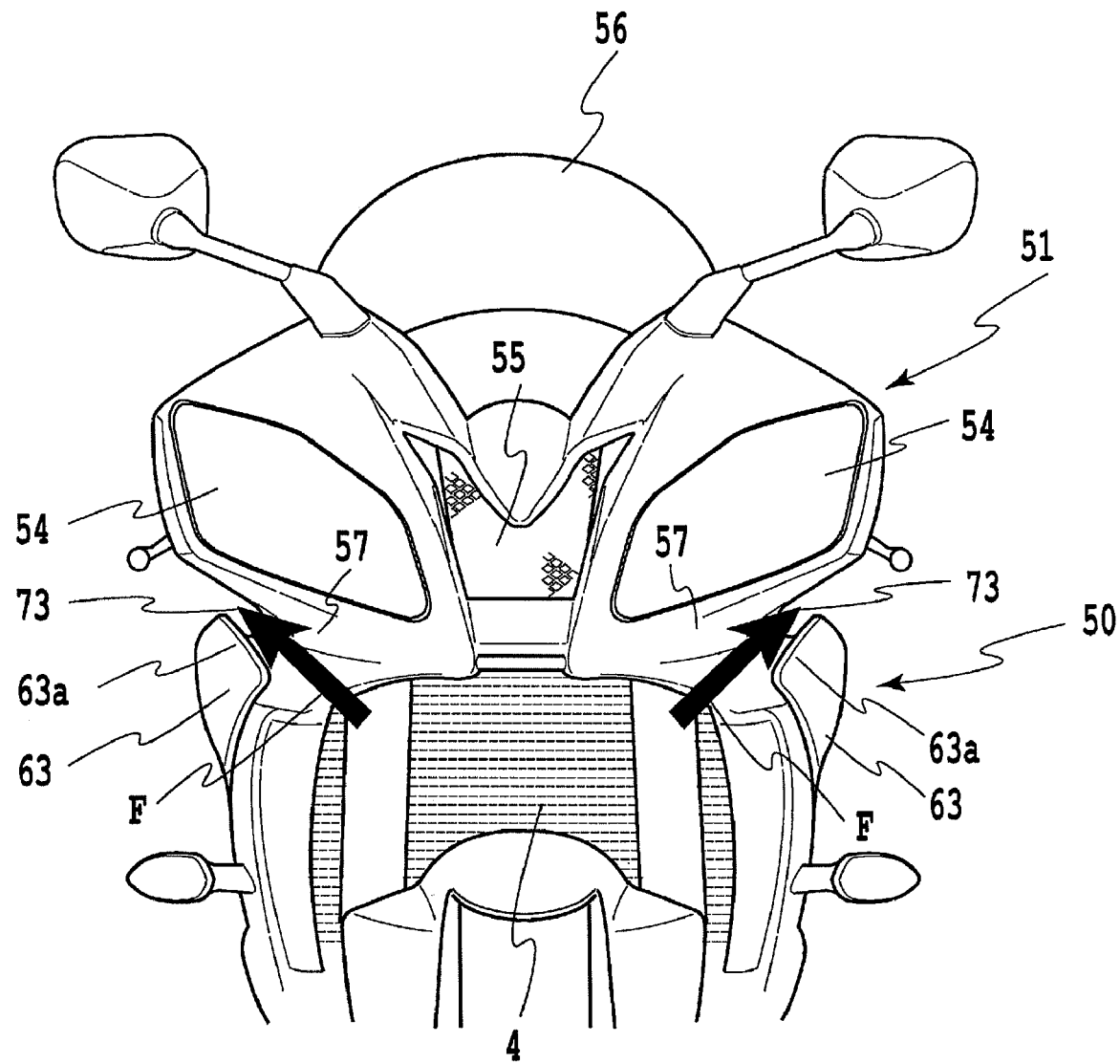
FIG. 3 is an enlarged front view of an upper portion of the straddle type vehicle of FIG. 1.

Embodiments of the present invention will now be described with reference to the accompanying drawings. As shown in FIGS. 1 and 2, a straddle type vehicle (e.g., a motorcycle) is provided that has the following components: a body frame 20; a front wheel 1; a rear wheel 2; an engine 3; a radiator 4; a front fork 5; a handlebar 6; a fuel tank 7; an air cleaner 8; a fuel injection system 9; a pivot 10; a rear frame 11; a swing arm 12 (as shown in FIG. 1 only); a power transmission 13 (as shown in FIG. 1 only); a seat 14; a rear suspension 15; an exhaust pipe 16; a muffler 17 (as shown in FIG. 2 only); and a front cowl 50.

With reference to FIGS. 1 and 2, the illustrated body frame 20 (see FIG. 2) comprises left and right main frames that extend diagonally downward and rearward from a head pipe 21. The head pipe 21 is positioned at a front end of the vehicle. Rear frames 11 are connected to the main frames 22. In the illustrated construction, the rear frames 11 extend rearward of a rearward portion of the main frames 22. Swing arms 12 are connected to a lower portion of the main frames 22. The swing arms 12 are connected so that the swing arms 12 can be pivoted vertically about an axis defined by a pivot 10. A rear wheel 2 is supported by the swing arms 12. Preferably, the rear wheel 2 rotates about a generally horizontal axis A1. A suitable rear suspension 15 is provided between the swing arms 12 and the rear frames 11. Other frame and suspension constructions also can be used.

On the head pipe 21, which is disposed at the front end of the body frame 20, a handlebar 6 is pivotably supported. Below the handlebar 6, front forks 5 are connected to the handlebar 6 such that the front forks 5 can be maneuvered by the handlebar 6. The front wheel 1 is connected to lower portions of the front forks 5. Preferably, the front wheel 1 rotates about a generally horizontal axis A2.

In one embodiment of the straddle type vehicle (e.g., motorcycle), an engine 3 is provided in a substantially longitudinally central portion and suspended from an engine suspension frame 23 provided on the lower side of and made integral with the main frame 22 of the body frame 20. Other constructions also can be used. In one embodiment, the engine 3 is a parallel 4-cylinder engine that is transversely mounted. In this configuration, the engine 3 has a cylinder 3A that is positioned generally above a crank case and that is slightly inclined. Because the engine 3 is mounted in this manner, the engine 3 is positioned generally below and between the left and right main frames 22.

Multiple exhaust pipes 16 are joined to an exhaust port that is positioned on a front side of the cylinder 3A. From the exhaust ports, the exhaust pipes 16 extend rearward along an underside of the illustrated engine 3. The exhaust pipes 16 merge and are connected to a muffler 17.

In one embodiment, a radiator 4 is positioned at substantially the same vertical height as the cylinder 3A. The radiator 4 also preferably is positioned generally forward of the engine 3 with an air passing surface facing in the forward direction. In other words, the surface through which air is introduced into the radiator 4 extends in a plane that is generally normal to a longitudinal direction of the vehicle.

A fan 4A can be provided rearward of the radiator 4. An air cleaner 8 and a fuel injection system 9 can be provided above the engine 3. A fuel tank 7 can be provided rearward of the engine at a location generally above the main frame 22. A seat 14 on which a rider can sit is placed on the rear frame 11 at a location generally rearward of the fuel tank 7. Generally below the seat 14, electrical equipment, such as a battery 18A, a relay 18B, and an ECU (engine control unit) 18C can be positioned on the rear frame 11. A power transmission system 13 can be positioned to the left of the rear portion of the vehicle body and the muffler 17 can be positioned to the right of the rear portion of the vehicle body.

With reference now to FIGS. 6 through 13, a front cowl 50 preferably extends from a location proximate an instrument panel (which is provided forward of the handlebar 6) to a location that is proximate the left and right sides of the engine 3. In one embodiment, the left and right sides of the engine as well as the exhaust pipe 16 are substantially covered by the front cowl 50. The front cowl 50 can be formed by a combination of an upper portion 51 and a lower portion 52, both of which, in one embodiment, can be formed from a reinforced plastic material. The front cowl upper portion 51 and the front cowl lower portion 52 can be composed of other suitable materials as well.

Figure 6:
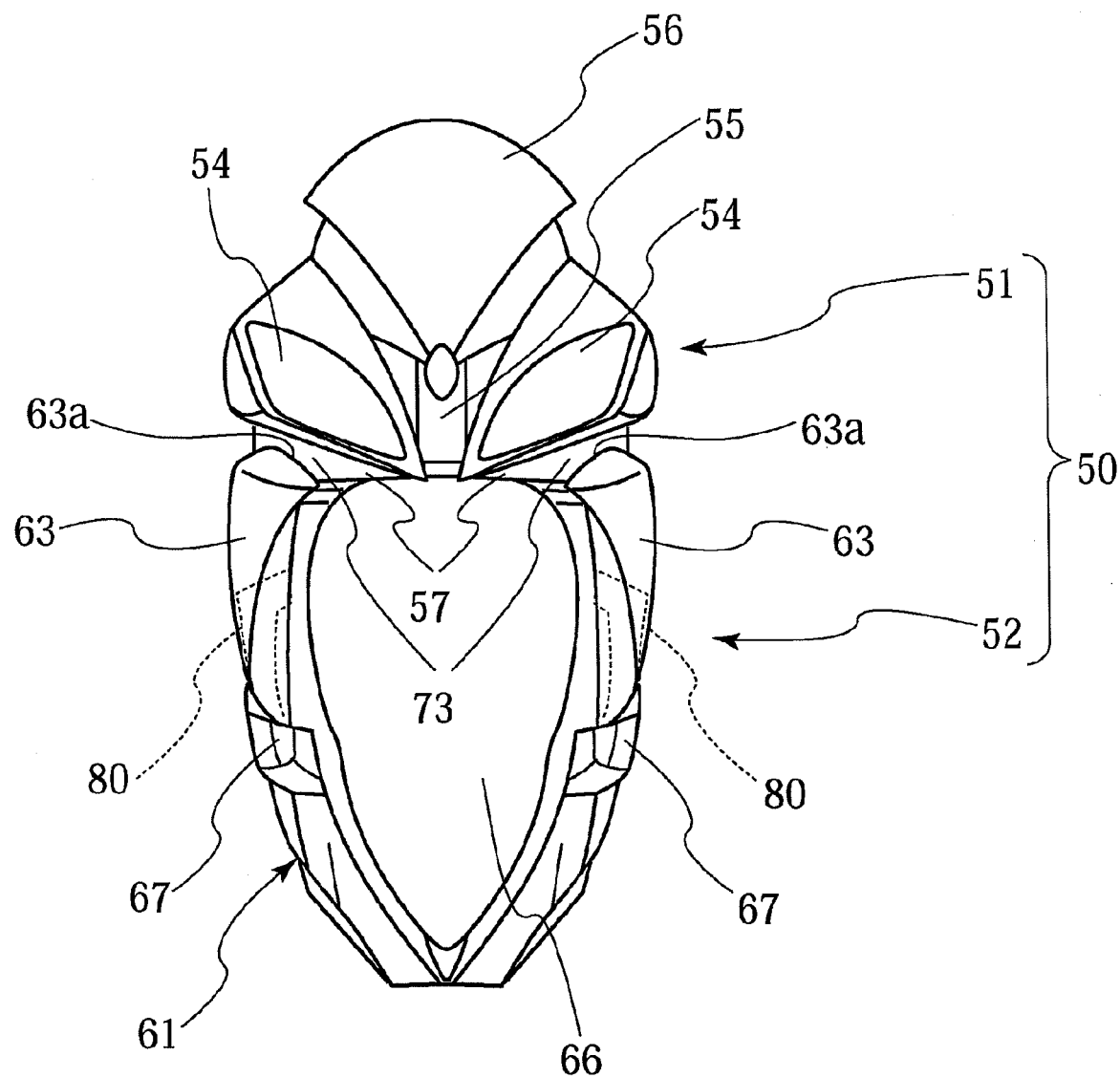
FIG. 6 is a front view of a front cowl of the straddle type vehicle of FIG. 1.
Figure 7:
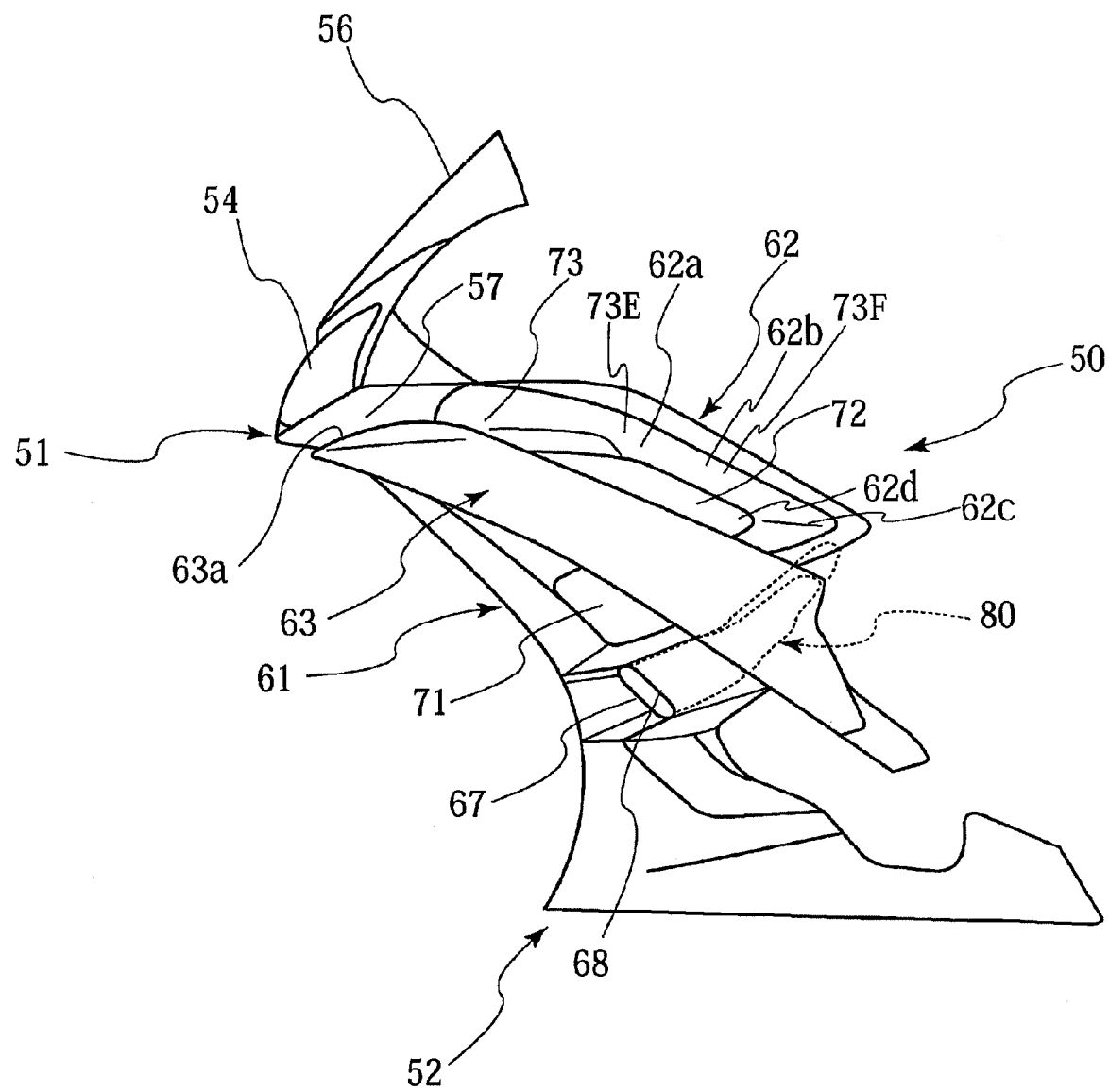
FIG. 7 is a side elevational view of the front cowl shown in FIG. 6.
Figure 8:
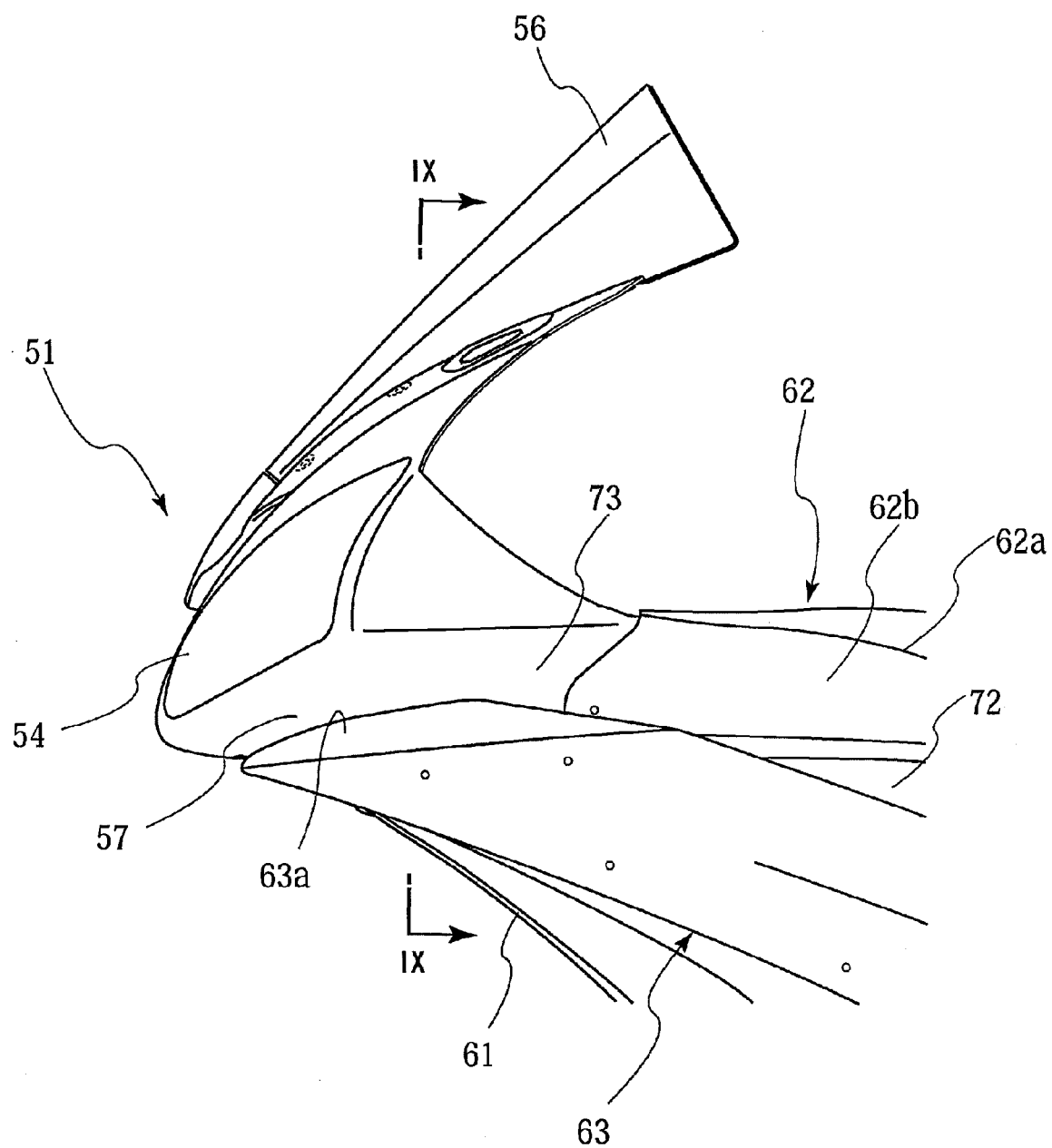
FIG. 8 is an enlarged side view of an upper portion of the front cowl shown in FIG. 6.
Figure 9:
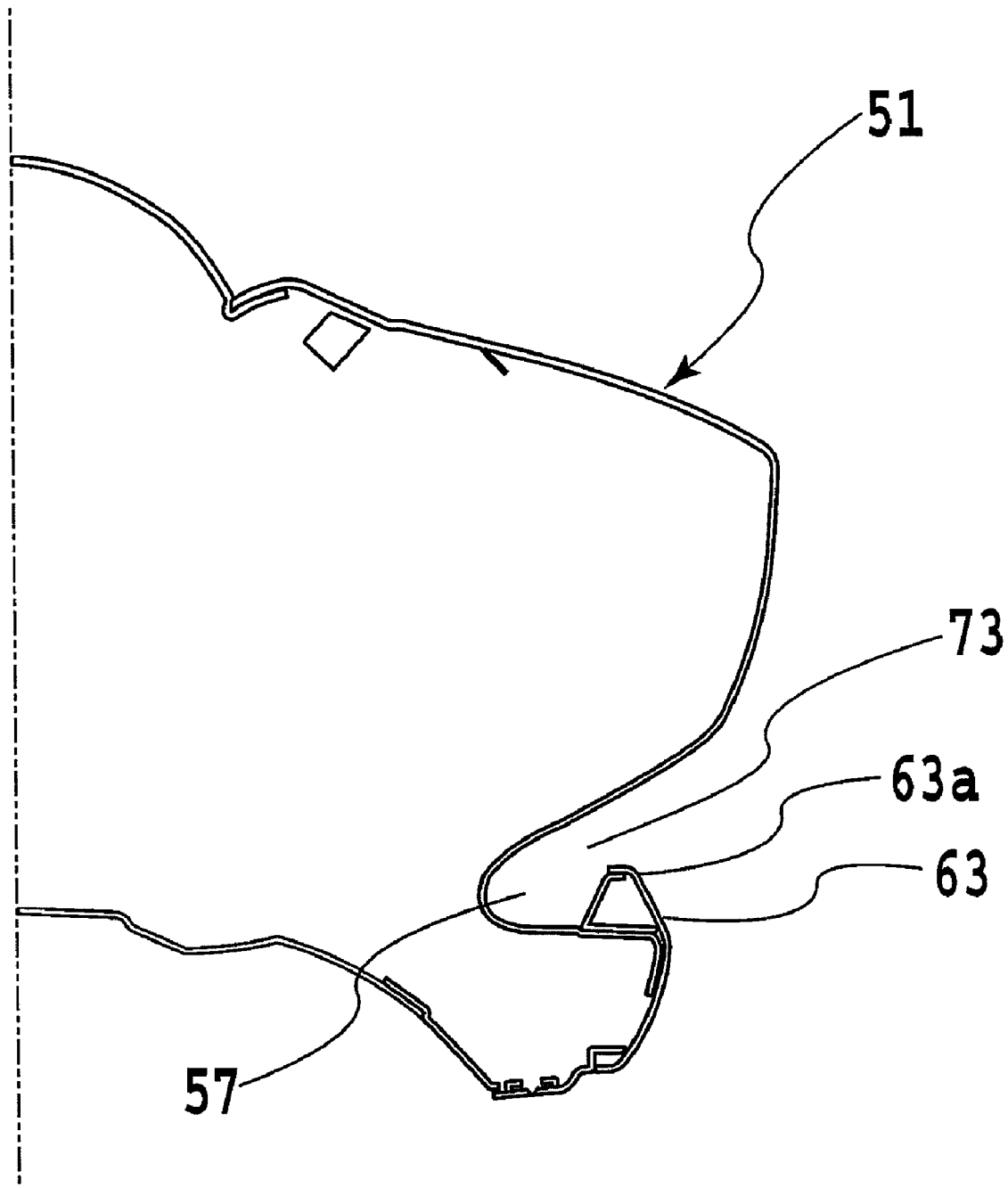
FIG. 9 is a cross-sectional view of the upper portion of the front cowl taken along line IX-IX of FIG. 8.
Figure 10:
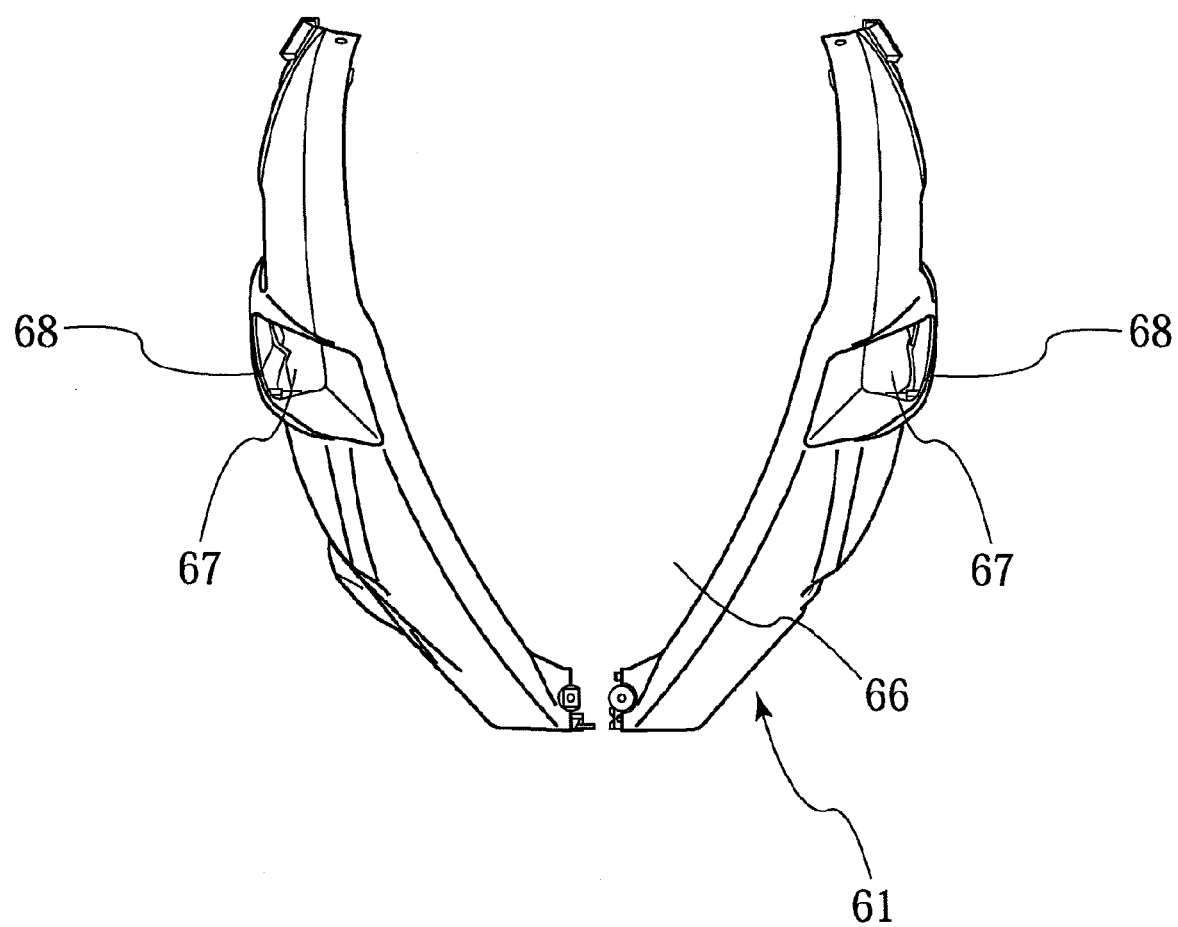
FIG. 10 is a front view of a lower cowl disposed on the front cowl shown in FIG. 6.
Figure 11:
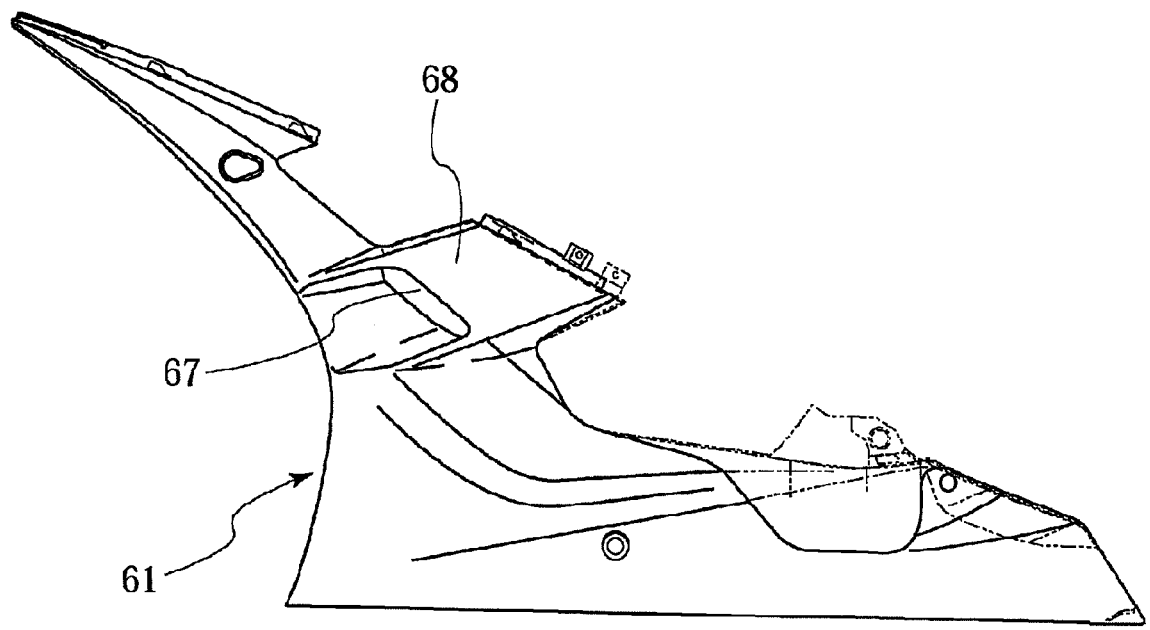
FIG. 11 is a side elevational view of the lower cowl shown in FIG. 10.

With reference to FIG. 7, the front cowl upper portion 51 preferably is sized and configured to cover components that are positioned ahead of the handlebar 6. The front cowl lower portion 52 preferably is sized and configured to cover the range from a lower edge portion of the front cowl upper portion 51 to the side portions of the engine 3. As shown in FIG. 6, the front cowl 50 advantageously comprises a central port 66. The central port 66 can be positioned at a central portion of a front wall of the front cowl 50. In one configuration, the central port 66 is formed in the lower portion 52 of the front cowl. As shown in the illustrated embodiment, the central port 66 can be positioned in proximity to the front wheel 1. Air traveling toward the radiator 4 is received from the central port 66 and the radiator 4 can be positioned rearward of the central port 66. Thus, air traveling through the central port 66 can be directed toward the radiator 4.

In one embodiment of the straddle type vehicle (e.g., motorcycle), left and right headlights 54 are positioned in the front cowl upper portion 51. Preferably, the headlights 54 are mounted such that the front cowl upper portion 51 is generally streamlined as a whole. With reference to FIG. 6, an air intake port 55 through which air is drawn into the air cleaner 8 can be positioned generally between the left and right headlights 54. A windscreen 56 preferably extends diagonally upward and rearward direction from the central upper portion of the front cowl upper portion 51. The windscreen 56, in one embodiment, covers the instrument panel from the front side. The windscreen 56 preferably is formed of a transparent resin. Recesses 57 preferably extend from the front side to the rear side of the front cowl upper portion 51 and can be provided along the longitudinal curves of the two side surfaces. The recesses 57 desirably are positioned lower than the headlamps 54 and higher than the radiator 4.

As shown in FIG. 6, the front cowl lower portion 52 can include a lower cowl 61 (as described below in connection with FIGS. 10 and 11) sized and configured to cover both sides of the radiator 4 and the exhaust pipe 16. The illustrated front cowl lower portion 52 also comprises a hooked upper cowl 62 (as described below in connection with FIG. 12) that is spaced from the lower cowl 61 and that extends along the main frame 22. The hooked upper cowl 62 preferably is connected at a front end to the front cowl upper portion 51. In some configurations, the front cowl upper portion 51 and the upper cowl 62 can be integrally formed. Knife-shaped panel type middle cowls 63 (as described below in connection with FIG. 13) can be provided between the lower cowl 61 and the upper cowl 62. Preferably, spaces are defined between the lower cowl 61 and the upper cowl 62 when the middle cowls 63 are removed. The spaces can be sized and configured to expose large portions of the side surfaces of the engine 3 and a portion of each of the side surfaces of the radiator 4.

The middle cowls 63 preferably are sized to be not large enough to cover the open portion as a whole between the lower cowl 61 and upper cowl 62. The middle cowls 63 extend generally longitudinally such that they vertically divide the air discharge ports for air being exhausted from the radiator. In one embodiment, between the middle cowls 63 and the lower cowl 61, a lower air discharge port 71 is defined. The lower discharge port 71 discharges air exhausted from the radiator 4. In addition, between the middle cowls 63 and the upper cowl 62, an upper air discharge port 72 is defined. The upper air discharge port 72 discharges air exhausted from the radiator 4. The upper air discharge port 72 is a discharge port mainly for the exhausted air that has passed through an upper portion 4U of the radiator 4 while the lower air discharge port 71 is a discharge port mainly for the exhausted air that has passed through a lower portion 4D of the radiator 4.

Figure 5:
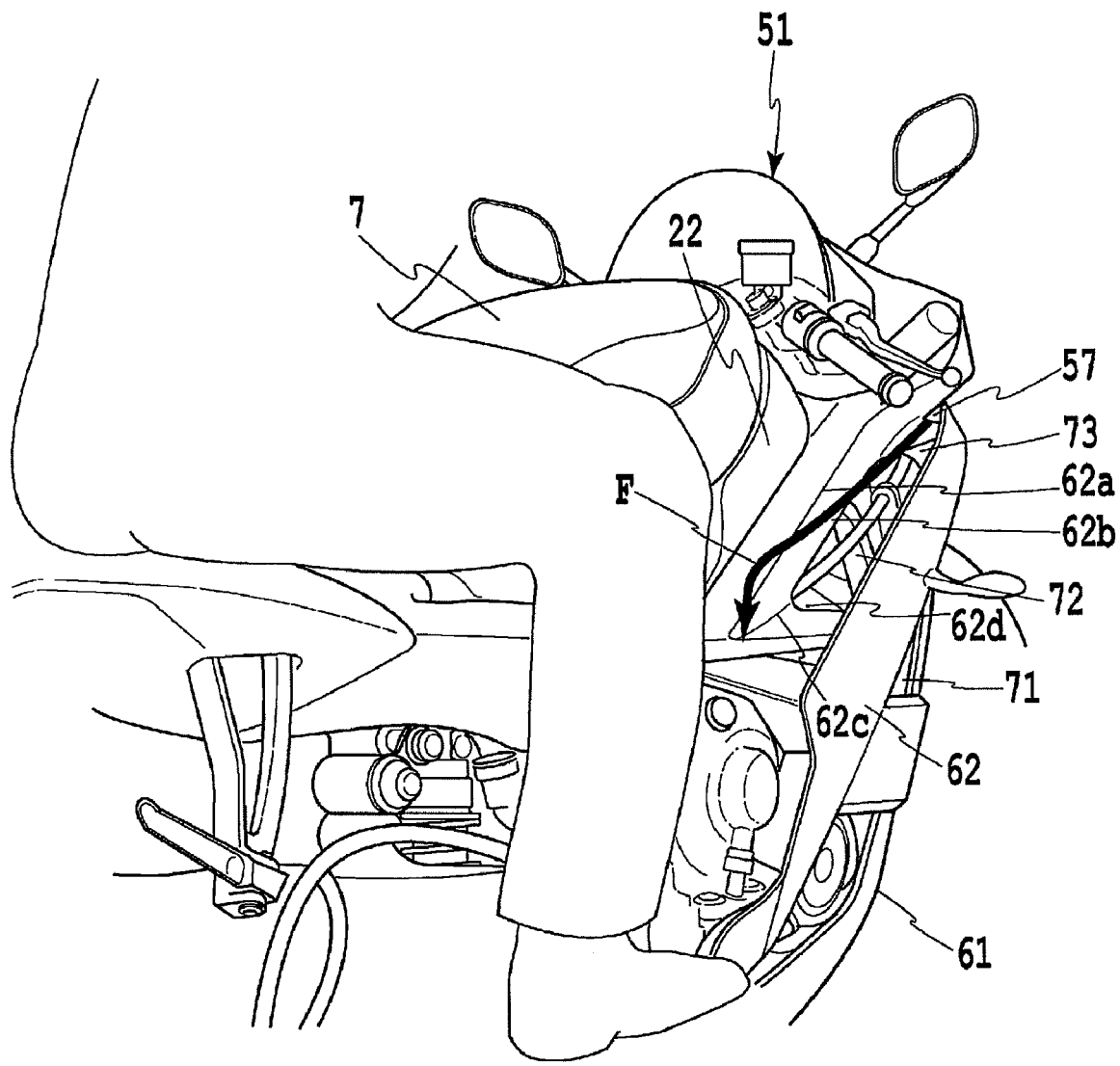
FIG. 5 is a perspective view taken from the rear of the vehicle showing a front right side portion of the straddle type vehicle of FIG. 1. The straddle type vehicle is shown having a rider seated on the vehicle.
Figure 12:
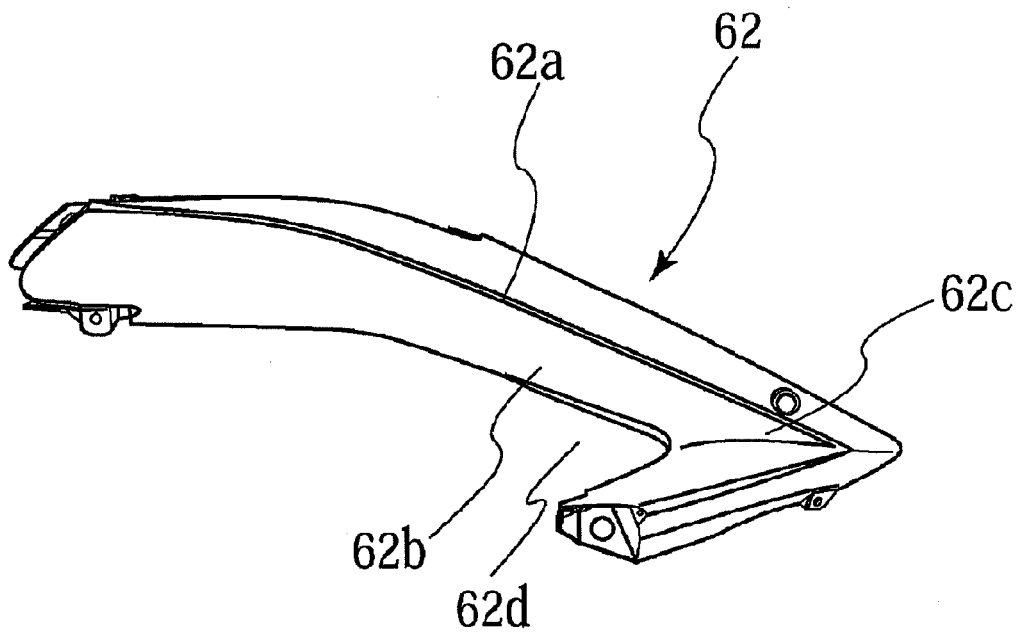
FIG. 12 is a side elevational view of an upper cowl disposed on the front cowl shown in FIG. 6.
Figure 13:
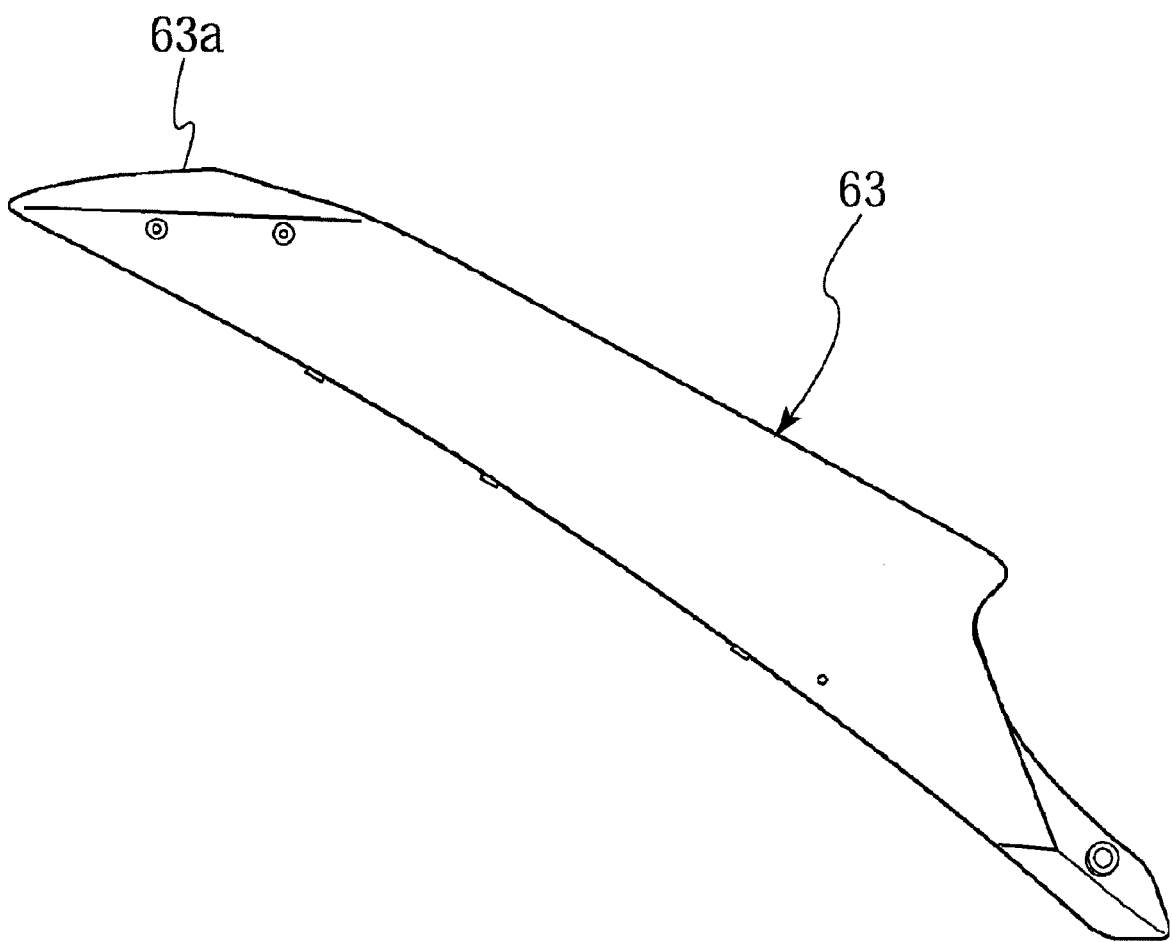
FIG. 13 is a side elevational view of a middle cowl disposed on the front cowl shown in FIG. 6.

As shown in FIGS. 5 and 12, the upper cowl 62 preferably is formed in the shape of a hook, as seen from a side elevational view, and is generally mountain-shaped in cross-section. The mountain-shaped cross-section comprises a ridge portion 62a and an inner inclined surface 62b. Preferably, the inner inclined surface 62b extends at an angle relative to the ridge portion 62a. At least a portion of the inner inclined surface 62b is positioned opposite to the middle cowls 63 and generally parallel with an upper edge of the middle cowl 63.

In this manner, the upper air discharge port 72 is seen with a larger opening in a side elevation view than the same port when viewed from a location diagonally above the discharge port 72. Therefore, radiator exhaust air that travels diagonally upward passes through the upper air discharge port 72.

The ridge portion 62a preferably is curved with the inner inclined surface 62b being on the inside of the curve defined by the ridge portion 62a. Therefore, the bent portion of the inclined surface 62b, which has an apex at the ridge portion 62a, defines a valley-shaped terminal wall 62c. The terminal wall 62c preferably is positioned along a rearward portion of the upper cowl 62. More preferably, the terminal wall 62c is positioned ahead of the foot of a driver sitting on the seat (as shown in FIG. 5). Since the inner inclined surface 62b comprises a hooked configuration, the upper cowl 62, and the inclined surface 62b of the illustrated embodiment, defines a recess 62d recessed inward in the widthwise direction of the vehicle body relative to the balance of the upper cowl 62.

Figure 4:
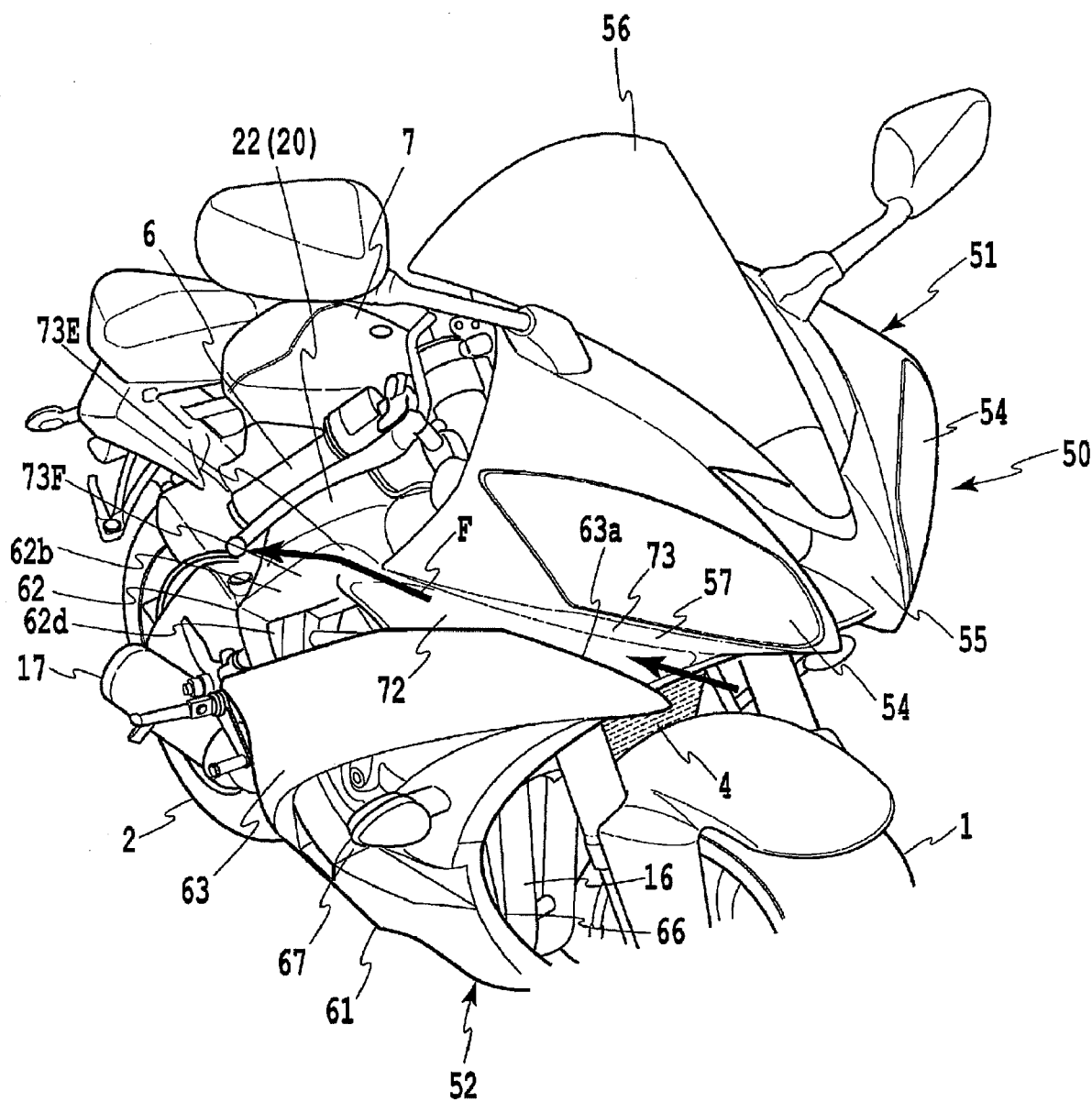
FIG. 4 is a perspective view taken from the front of the vehicle showing a right side portion of the straddle type vehicle of FIG. 1.

With reference to FIGS. 4 and 5, the recess 57 defined in the lateral sides of the front cowl upper portion 51 are substantially connected to the inclined surface 62b and recess 62d of the upper cowl 62. The recess 57, together with the region defined between the inclined surface 62b and the middle cowls 63 define a vent passage 73. More particularly, the region can be defined as the space formed by the inclined surfaces 62b, the recess 62d and the middle cowls 63. The region can be called an extension 73E. The extension 73E preferably is positioned above the upper air discharge port 72. The extension 73E elongates the vent passage 73 to define a longer air travel path than just the recess 57 alone. Thus, the vent passage 73 is positioned above the upper air discharge port 72 and the vent passage 73 is adapted to receive traveling outside air and pass such air rearward therethrough. At a rear end of the extension 73E, diverter passages 73F can be positioned to redirect the outside air flowing rearward in the vent passages 73 to an outward flow.

This diverted passage 73F can be formed by the downwardly sloping inclined surface 62b and ridge portion 62a of the upper cowl 62. The diverter passage 73F also can extend in a horizontal section divergently in the rearward direction with the width of the diverter passages increasing in the lateral direction of the vehicle. In other words, the diverter passages 73F become wider in a direction away from the center of the vehicle. Because the air enters the recesses 57 forcibly, the air flows along the vent passage 73 substantially linearly from the front side to the rear side. Therefore, the traveling air necessarily spreads outward in the transverse direction (i.e., the width) of the vehicle and flows rearward as the air is directed laterally outward by the diverter passage 73F formed by the inclined surfaces 62b of the upper cowl 62. In one preferred configuration, the diverter passages 73F direct the airflow downward and outward to direct the air away from the legs of a rider.

The upper edges 63a of the side covers 63 preferably are fixed to upper side of the recesses 57 such that they project laterally outward. In this manner, the cross-section of the corresponding portions of the vent passage 73 is generally C-shaped. Therefore, the air flow can be focused and directed rearward without significant airflow bleed-off (i.e., significant air flow escaping from the passage 73). In one embodiment, the middle cowls 63 are fixed to the lower cowl 61 by screws. Any other suitable technique can be used. Because the vent passages 73 can be formed by combining the middle cowls 63 with the upper cowl 62 from the outer side so as to cover the lower portion of the upper cowl 62 (see FIG. 9), forming of the vent passage 73 can be done with ease.

As shown in FIGS. 1, 2, and 7, the outside air induction ducts 80 are provided inside of the lower cowl 61 and middle cowls 63 such that a forward facing intake port 67 opens toward the direction in which traveling air is introduced and such an outlet port is opened toward a space surrounded by the main frame 22, the engine 3, and the fuel tank 7. At the rear of this space, air discharge passages for moving the air flow toward the rear are secured. These air discharge passages preferably are secured between the rear frames 11 and the swing arms 12 in a position that is lower than the pivot 10 such that the swing arms 12 can be freely swung in the vertical direction.

The intake ports 67 preferably are formed in side walls of the lower cowl 61 of the front cowl lower portion 52. The intake ports 67 preferably communicate with the front end of the outside air induction ducts 80. The intake ports 67 advantageously are positioned lower than the lower end of the radiator 4. In one preferred configuration, the intake ports 67 are positioned in the side walls of the front cowl lower portion 52 at a location vertically below the lower side air discharge ports 71.

The operation of the straddle type vehicle (e.g., motorcycle) will now be described. Some of the air passed through the radiator 4 during movement of the vehicle flows out upward or rearward from the upper air discharge ports 72 provided in side walls of the front cowl 50. As the outside air flows relative to the straddle type vehicle, shown by arrows F in FIGS. 1 through 5, the traveling air F flows from front to rear at a high speed along in the vent passage 73, which is positioned above the air discharge port 72. The air flow F creates a pressure differential with the air flow having a lower pressure than the chamber in which the radiator is positioned. Because of the pressure difference, the heated exhaust air that passed through the radiator will be sucked through the upper air discharge port 72 to the outside of the vehicle. As a result, the heat in the front cowl 50 can be discharged efficiently to the outside of the vehicle.

Moreover, since the vent passage 73 extends in the longitudinal direction of the vehicle up to a position just above the upper air discharge port 72, heated air that is passed through the radiator 4 can flow smoothly in the rearward direction. Because the diverter passages 73F for inducing the air flowing rearward in the vent passages 73 outward are positioned at the rearward portions of the extensions 73E of the vent passages 73, the heated exhaust air from the radiator 4 can be diverted outward in positions in front of the legs of the driver. Therefore, the heated exhaust air is less likely to contact the legs of the driver, which results in a more comfortable riding experience.

In this straddle type vehicle (e.g., motorcycle), two vertically spaced ports (i.e., the lower air discharge port 71 and the upper air discharge port 72) for discharging the radiator-passed exhaust air are provided. As a result, even when a cooling operation is carried out solely by operation of the radiator fan 14A, the hot air can be discharged smoothly. In addition, because the vent passages 73 mentioned above are formed in regions not occupied by the headlight 54 and the radiator 4, a typically vacant space in the vehicle between the headlight 54 and the radiator 4 can be effectively utilized.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For instance, it is possible to form any or all of the cowlings either integrally or to further segment the cowlings in to sub-cowlings that perform in the manners discussed herein. In other words, the upper cowling can be formed in multiple pieces in some embodiments relative to the constructions shown and described above. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A straddle type vehicle comprising a frame, the frame being supported by a wheel, the wheel rotating about a generally horizontal axis, an engine supported by the frame, a radiator being positioned generally forward of the engine, a front cowl enclosing at least a portion of the frame, the front cowl extending from a location generally over the front wheel to a location proximate the engine, the front cowl generally defining a chamber in which the radiator is positioned, an air discharge port being defined in a side surface of the front cowl at a location generally rearward of the radiator, the discharge port being capable of receiving air that comprises passed through the radiator, a vent passage defined along a longitudinal portion of the side surface of the front cowl, at least a portion of the longitudinal portion being positioned vertically above the air discharge port, the vent passage comprising a forward facing opening such that air through which the vehicle operates can be directed into the vent passage.

2. The straddle type vehicle of claim 1, wherein the front cowl comprises an upper cowl, a lower cowl and a middle cowl, an upper surface of the vent passage being defined by the upper cowl and a lower surface of the vent passage being at least partially defined by the middle cowl.

3. The straddle type vehicle of claim 2, wherein the upper surface of the vent passage extends further rearward than the lower surface of the vent passage.

4. The straddle type vehicle of claim 3, wherein the upper surface of the vent passage curves downward at a location rearward of the air discharge port such that the rearwardly directed airflow channeled by the vent passage can be diverted laterally outward by the downwardly curved upper surface.

5. The straddle type vehicle of claim 3, wherein the upper surface of the vent passage extends downward in a rearward direction such that a forwardmost portion of the upper surface is vertically higher than a rearwardmost portion of the upper surface.

6. The straddle type vehicle of claim 1, wherein at least a portion of the vent passage comprises a generally c-shaped cross-section.

7. A straddle type vehicle comprising:
   at least one wheel that rotates about a generally horizontal axis;
   a vehicle body supported at least in part by the at least one wheel, the vehicle body comprising a front portion comprising a front end;
   an engine supported at least in part by the vehicle body;
   a radiator supported at least in part by the vehicle body, wherein the radiator is disposed farther forward than the engine such that the distance between a portion of the radiator and the front end of the vehicle body is less than the distance between a portion of the engine and the front end of the vehicle body; and a front cowl comprising at least one side wall that at least partially covers the front portion of the vehicle body, the at least one side wall comprising at least one vent passage and at least one discharge port, the at least one vent passage receiving air from outside of the vehicle and directing such air rearward along the at least one side wall of the front cowl and the at least one discharge port discharging exhaust air from the radiator to the outside of the vehicle, wherein at least a portion of the vent passage comprises a generally c-shaped cross-section.

8. The straddle type vehicle of claim 7, wherein the radiator is disposed in the front portion of the vehicle.

9. The straddle type vehicle of claim 7, wherein the engine is disposed in the front portion of the vehicle.

10. The straddle type vehicle of claim 7, wherein the at least one vent passage is disposed at least partially above the at least one discharge port along the at least one side wall of the front cowl.

11. The straddle type vehicle of claim 7, wherein the at least one discharge port is disposed at least partially behind the radiator.

12. The straddle type vehicle of claim 7, wherein the at least one vent passage comprises at least one extension that extends the at least one vent passage in a generally longitudinal direction of the vehicle to a position above and substantially near the at least one discharge port.

13. The straddle type vehicle of claim 12 further comprising at least one diverter passage for diverting air from the at least one vent passage laterally outward.

14. The straddle type vehicle of claim 7 further comprising a headlight disposed at least partially on a front portion of the front cowl, wherein the at least one vent passage is disposed between the headlight and the radiator.

15. A straddle type vehicle comprising:
at least one wheel that rotates about a generally horizontal axis;
a vehicle body supported at least in part by the at least one wheel, the vehicle body comprising a front portion comprising a front end;
an engine supported at least in part by the vehicle body;
a radiator supported at least in part by the vehicle body, wherein the radiator is disposed farther forward than the engine such that the distance between a portion of the radiator and the front end of the vehicle body is less than the distance between a portion of the engine and the front end of the vehicle body;
a front cowl comprising an upper cowl, a middle cowl, and a lower cowl;
at least one discharge port disposed on the front cowl for discharging exhaust air from the radiator to the outside of the vehicle; and
at least one vent passage disposed on the front cowl for receiving air from outside of the vehicle and directing such air rearward along a side wall of the front cowl, wherein the at least one vent passage comprises at least one extension that extends the at least one vent passage in a generally longitudinal direction of the vehicle to a position above and substantially near the at least one discharge port;
wherein the middle cowl is substantially fixed to the upper cowl such that the middle cowl at least partially covers an outer surface of the upper cowl.

16. The straddle type vehicle of claim 15, wherein the upper cowl is substantially fixed to the vehicle body and the at least one extension is disposed thereon.

17. The straddle type vehicle of claim 15, wherein the upper cowl comprises at least one recess extending inward toward the vehicle body such that the at least one vent passage is disposed between the at least one recess and the middle cowl.

18. The straddle type vehicle of claim 15, wherein the lower cowl is substantially fixed to the vehicle body and at least partially covers a lower portion of the engine.

19. The straddle type vehicle of claim 18, wherein the middle cowl is substantially fixed between the upper cowl and the lower cowl.

20. A straddle type vehicle comprising:
at least one wheel that rotates about a generally horizontal axis;
a vehicle body supported at least in part by the at least one wheel, the vehicle body comprising a front portion comprising a front end;
an engine supported at least in part by the vehicle body;
a radiator supported at least in part by the vehicle body, wherein the radiator is disposed farther forward than the engine such that the distance between a portion of the radiator and the front end of the vehicle body is less than the distance between a portion of the engine and the front end of the vehicle body;
a front cowl comprising an upper cowl, a middle cowl, and a lower cowl;
at least one discharge port disposed on the front cowl for discharging exhaust air from the radiator to the outside of the vehicle; and
at least one vent passage disposed on the front cowl for receiving air from outside of the vehicle and directing such air rearward along a side wall of the front cowl, wherein the at least one vent passage comprises at least one extension that extends the at least one vent passage in a generally longitudinal direction of the vehicle to a position above and substantially near the at least one discharge port;
wherein the at least one discharge port comprises a first discharge port and a second discharge port.

21. The straddle type vehicle of claim 20, wherein the first discharge port is disposed above the middle cowl and adapted to discharge exhaust air from an upper portion of the radiator and the second discharge port is disposed below the middle cowl and adapted to discharge exhaust air from a lower portion of the radiator.

22. The straddle type vehicle of claim 15 further comprising a headlight disposed at least partially on a front portion of the front cowl, wherein the at least one vent passage is disposed between the headlight and the radiator.

23. A straddle type vehicle comprising:
at least one wheel that rotates about a generally horizontal axis;
a vehicle body supported at least in part by the at least one wheel;
a radiator supported at least in part by the vehicle body; and
a front cowl that at least partially covers a front portion of the vehicle body, wherein the front cowl comprises at least one vent passage for receiving air from outside of the vehicle and directing such air rearward and at least one discharge port for discharging exhaust air from the radiator to the outside of the vehicle, wherein at least a portion of the vent passage comprises a generally c-shaped cross-section.

24. A straddle type vehicle comprising:

at least one wheel that rotates about a generally horizontal axis;

a vehicle body supported at least in part by the at least one wheel;

a radiator supported at least in part by the vehicle body; and a front cowl that at least partially covers a front portion of the vehicle body, wherein the front cowl comprises at least one vent passage for receiving air from outside of the vehicle and directing such air rearward and at least one discharge port for discharging exhaust air from the radiator to the outside of the vehicle;

wherein the at least one discharge port comprises a lower discharge port and an upper discharge port such that heated exhaust air from the radiator can be discharged through both the lower discharge port and the upper discharge port.

25. The straddle type vehicle of claim 23, wherein the at least one vent passage comprises a first vent passage and a second vent passage wherein the first vent passage is disposed on the left side of the vehicle for directing outside air along a left side wall of the front cowl and the second vent passage is disposed on the right side of the vehicle for directing outside air along a right side wall of the front cowl.

* * * * *